United States Patent
Ni (10) Patent No.: US 9,489,338 B1
(45) Date of Patent: Nov. 8, 2016

(54) SYSTOLIC ARRAY BASED ARCHITECTURE FOR BRANCH AND BOUND ALGORITHMS

(71) Applicant: Altera Corporation, San Jose, CA (US)

(72) Inventor: Yi Ni, San Jose, CA (US)

(73) Assignee: Altera Corporation, San Jose, CA (US)

( * ) Notice: Subject to any disclaimer, the term of this patent is extended or adjusted under 35 U.S.C. 154(b) by 381 days.

(21) Appl. No.: 14/163,570

(22) Filed: Jan. 24, 2014

(51) Int. Cl.
*G06F 17/00* (2006.01)
*G06F 15/80* (2006.01)
*G06F 17/30* (2006.01)
*H04L 29/08* (2006.01)

(52) U.S. Cl.
CPC ..... *G06F 15/8046* (2013.01); *G06F 17/30333* (2013.01); *H04L 67/2885* (2013.01)

(58) Field of Classification Search
CPC ................. H04L 67/2885; G06F 17/30333
See application file for complete search history.

(56) References Cited

U.S. PATENT DOCUMENTS 5,396,625 A * 3/1995 Parkes .................. G06T 9/008

OTHER PUBLICATIONS

U.S. Appl. No. 14/024,860, filed Sep. 12, 2013, Ni.

* cited by examiner

*Primary Examiner* — Zachary K Huson
(74) *Attorney, Agent, or Firm* — Fletcher Yoder P.C.

(57) ABSTRACT

Techniques and mechanisms implement a branch and bound algorithm using a systolic array based circuit architecture. For example, a systolic array may perform calculations associated with nodes of a tree data structure. Information associated with the nodes may be analyzed and stored by a controller. The controller may also provide data to the systolic array based on the information associated with the nodes.

22 Claims, 12 Drawing Sheets

SYSTOLIC ARRAY BASED ARCHITECTURE FOR BRANCH AND BOUND ALGORITHMS

TECHNICAL FIELD

This disclosure generally relates to integrated circuits. More specifically, the disclosure relates to systems and methods for using a systolic array based architecture for implementing branch and bound algorithms.

DESCRIPTION OF THE RELATED TECHNOLOGY

A general purpose central processing unit (CPU) is a semiconductor integrated circuit which can perform a variety of algorithms to solve problems. In a typical scenario, a CPU may include an instruction set providing basic operations it can perform. An algorithm may be provided in a computer program and, based on the instruction set, a series of instructions associated with the program may be executed by the CPU to perform the algorithm.

In some scenarios, a designer may wish for an algorithm to be performed faster. For example, an application specific integrated circuit (ASIC) and a programmable logic device (PLD) are other semiconductor integrated circuits that can be designed to incorporate an architecture for particular algorithms, and therefore, provide a faster solution than a general purpose CPU.

SUMMARY

The subject matter described herein provides a technique for a device using a systolic array based architecture for performing branch and bound algorithms.

In one example, a circuit for performing calculations associated with nodes of a tree data structure is disclosed. A systolic array may be used to perform calculations associated with the nodes. In some implementations, the systolic array may provide calculated scores associated with the nodes. A controller may determine node information to store in a memory based on the scores.

These and other features will be presented in more detail in the following specification and the accompanying figures, which illustrate by way of example.

DETAILED DESCRIPTION OF PARTICULAR EMBODIMENTS

A branch and bound algorithm is used for finding possible solutions of various optimization problems. Generally, a branch and bound algorithm may be associated with a hierarchical tree data structure with all possible solution choices. Branches of the tree may be descended and sections of the tree bound, or removed from consideration, in order to find a more optimal solution to the problem. Branch and bound may be used for DNA sequencing, integer programming, "knapsack" problems, and other combinatorial optimization problems.

Figure 1A:
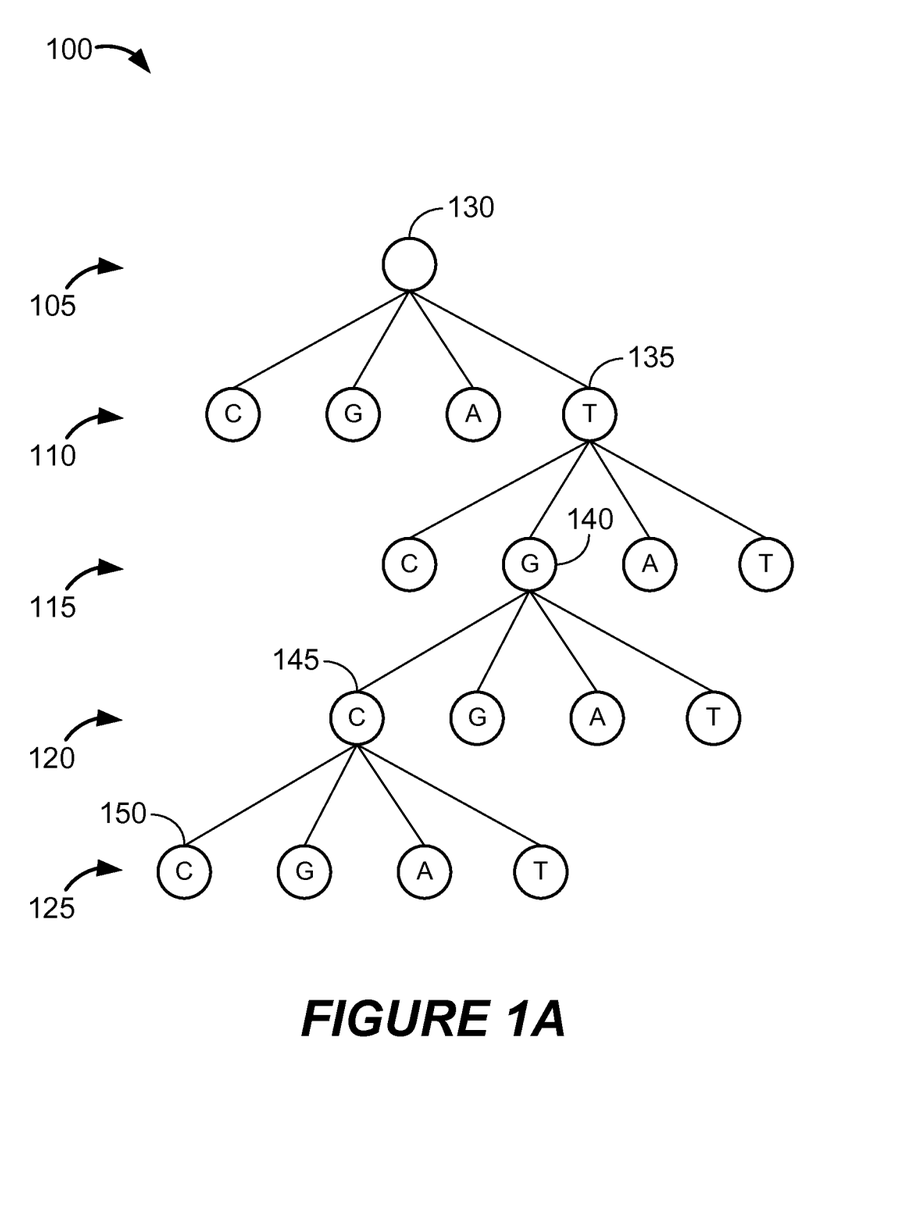
FIG. 1A illustrates an example of a tree data structure according to an exemplary implementation.

FIG. 1A illustrates an example of a tree data structure according to an exemplary implementation. In the implementation of FIG. 1A, tree 100 represents sequences of DNA nucleotides C, G, A, and T that may be part of a DNA sequencing that can be solved with a branch and bound algorithm. Tree 100 includes a starting node 130 at a level of depth-0 105. Each node is associated with four children nodes at a lower depth level. For example, node 130 is associated with children nodes in depth-1 110 immediately below depth-0 130. That is, node 130 has four children nodes, each representing one of a C, G, A, and T in a DNA sequence. Likewise, each node in depth-1 110, depth-2 115, depth-3 120, and depth-4 125 are associated with four children nodes, each including nodes associated with C, G, A, and T of DNA sequences.

For example, node 135 associated with parent node 130 and T in depth-1 110 has four children nodes at depth-2 115. Accordingly, node 135 includes four children nodes at depth-2 115. Though not depicted in FIG. 1A, the other nodes associated with C, G, and A in depth-1 110 also include four children nodes associated with C, G, A, and T. As such, in the implementation of FIG. 1A, depth-1 110 includes four nodes. Depth-2 115 includes sixteen nodes (i.e., four children nodes for each of the four nodes in depth-1 110). Depth-3 120 includes sixty-four nodes (i.e., four children nodes for each of the sixteen nodes in depth-1 115). Depth-4 125 includes two hundred fifty-six nodes (i.e., four children nodes for each of the sixty-four nodes in depth-3 120). Depth-5 may include one thousand four nodes (i.e., four children nodes for each of the two hundred fifty-six nodes in depth-4 125), and so forth.

In other implementations, a tree data structure may have a varying number of children nodes for each parent node. Additionally, some nodes at a level may have children nodes while other nodes in the same level do not. Accordingly, any type of tree data structure may be used.

In the example of FIG. 1A, DNA sequences may be created by following paths in tree 100 and selecting a node from each depth level. For example, if in each depth level of tree 100 the node associated with C is selected, a DNA sequence of all C may be selected. That is, in the example of FIG. 1A with depth-4 125, a sequence of CCCC may be selected. As another example, if node 135 is selected from depth-1 110, node 140 is selected from depth-2 115, node 145 is selected from depth-3 120, and node 150 is selected from depth-4 125, a DNA sequence of TGCC is selected.

Figure 1B:
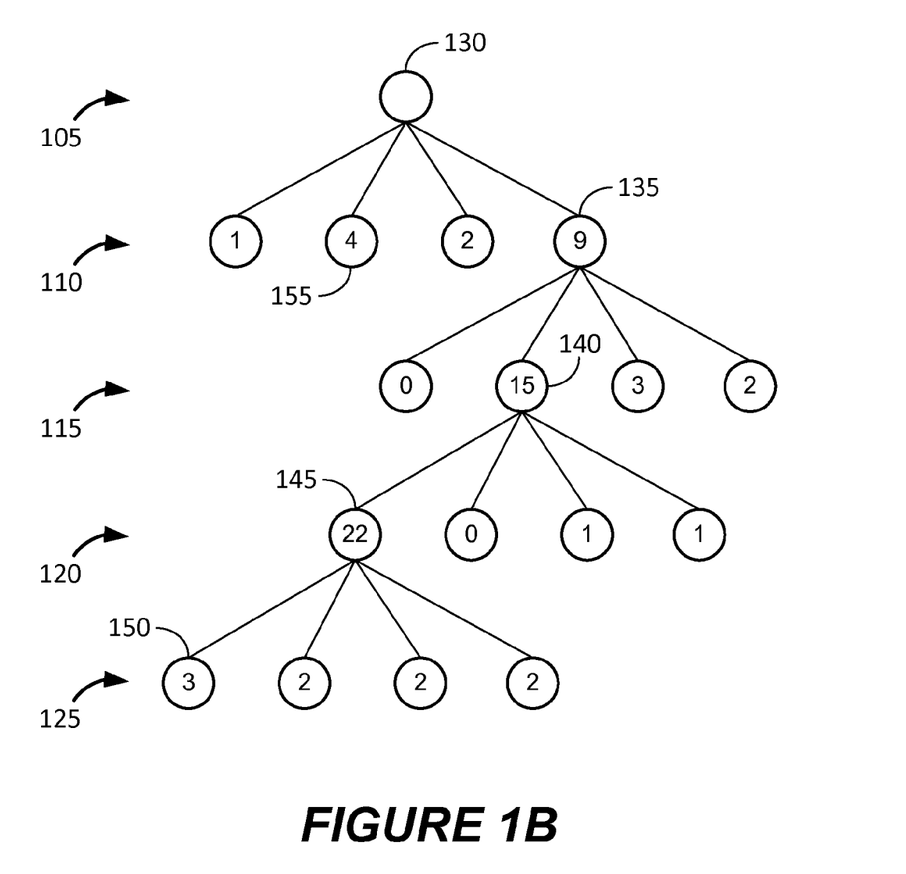
FIG. 1B illustrates an example of scores for the tree data structure of FIG. 1A according to an exemplary implementation.

FIG. 1B illustrates an example of scores for the tree data structure of FIG. 1A according to an exemplary implementation. In the implementation of FIG. 1A, each node is associated with a score that may be calculated by the algorithm. For example, in depth-1 110, the first node (i.e., the node associated with C) has a score of one. The second node (i.e., the node associated with G) has a score of four. The third node (i.e., the node associated with A) has a score of two. The fourth node (i.e., the node associated with T) has a score of nine. Likewise, the nodes in depth-2 115, depth-3 120, and depth-4 125 in FIG. 1B also have scores.

In one implementation of a branch and bound algorithm, tree 100 may be analyzed level-by-level based on scores associated with each node. The node with the highest score in the same level (e.g., depth-1) may be selected for inclusion in a DNA sequence and the children nodes of the node with the highest score among the nodes selected for the next position in the DNA sequence.

For example, in FIG. 1B, node 135 may be selected as the first nucleotide in the DNA sequence because node 135 has the highest score among the nodes in depth-1 110. Accordingly, a DNA sequence that may be a solution to the problem may start with T. The children nodes of node 135 at depth-2 115 include scores of zero, fifteen, three, and two. Since node 140 has the highest score (i.e., fifteen) among the nodes in depth-2 115, it may be selected to be the second nucleotide in the DNA sequence. Accordingly, the DNA sequence that may be a solution to the problem may start with TG. Next, the children nodes of node 140 at depth-3 may be analyzed. Node 145 with a high score of twenty-two may be selected, and therefore, create a DNA sequence of TGC. The children of node 145 may then be analyzed, and node 150 may be selected to form a DNA sequence of TGCC. Descending down further children nodes may be performed to create a DNA sequence.

In another implementation, scores may be stored. As scores are analyzed, the DNA sequence may "rewind" to a previous node and descend into its children nodes to restart the sequence at a particular position. That is, the scores may be associated with the DNA sequence formed, and if a score for a current DNA sequence is lower than a score of another sequence at a higher depth level, then the DNA sequence may be reverted back to the higher depth level and descend down a different path to form a new DNA sequence.

For example, in FIG. 1B, node 135 may be selected in depth-1 110 because the sequence T has a higher score than the sequences of a single C, G, or A. Accordingly, the children of node 135 at depth-2 115 may be analyzed. The score of the first node is zero, and therefore, the score of a TC DNA sequence may be zero. The second node at depth-2 115 has a score of fifteen. Accordingly, the DNA sequence TG has a score of fifteen. The third node of the children nodes of node 135 has a score of three, and therefore, a DNA sequence of TA has a score of three. Lastly, the fourth node of the children of node 135 has a score of two, providing a DNA sequence of TT a score of two.

Since the sequence of TG has a score of fifteen, it may be selected and its children nodes analyzed. Node 145 has a score of twenty-two, and therefore, a DNA sequence of TGC has a score of 22. That is, the score increases from fifteen to twenty-two as the sequence extends from TG to TGC. Other scores may decrease, for example, for node 142, the sequence of TGG decreases the score to zero. For the children of node 145 in depth-4 125, node 150 has a highest score of three. Accordingly, a DNA sequence of TGCC has a score of three.

However, the DNA sequence of G has a score of four. That is, node 155 at depth-1 110 is associated with a DNA sequence of G that has a higher score than the DNA sequence of TGCC associated with node 150 at depth-4 125. Accordingly, the algorithm may ascend back to depth-1 110 and select node 155 as part of a new DNA sequence.

As such, the algorithm branches down the tree finding better solutions. Additionally, the algorithm may bound certain branches of the tree and limits its search within a smaller solution space or subtree based on the scores. Moreover, the sequence or path through the tree may restart mid-sequence (i.e., revert to a higher level at a particular position within the sequence). For example, a sequence of CGAT may be reverted back to CG and another one of C, G, or T may be selected as the third path in the sequence.

Figure 2A:
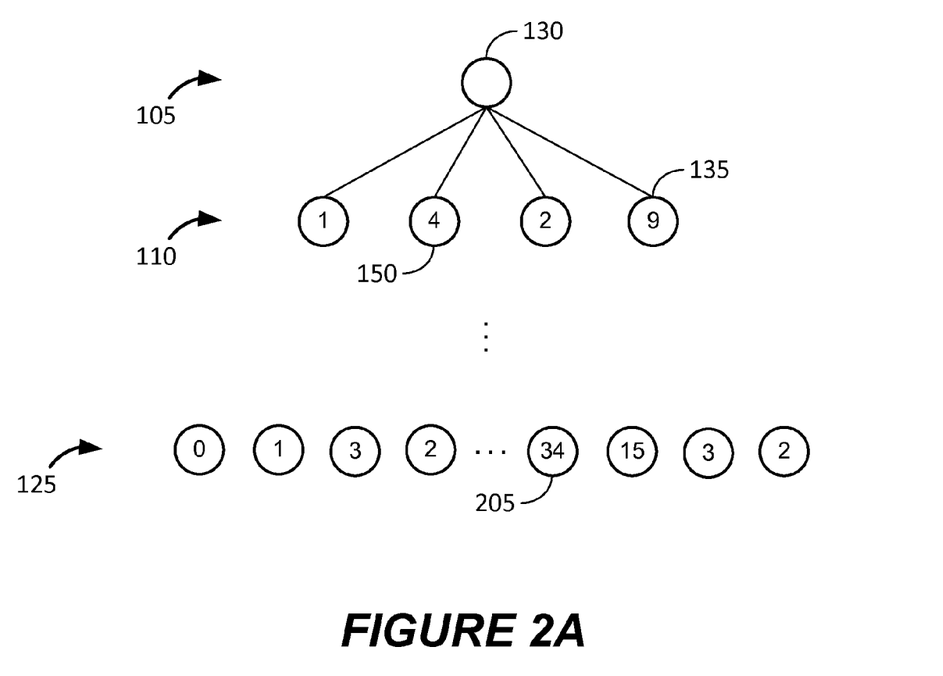
FIG. 2A illustrates an example of scores for a tree data structure according to an exemplary implementation.

FIG. 2A illustrates an example of scores for a tree data structure according to an exemplary implementation. In FIG. 2A, nodes for a subset of the two hundred fifty-six nodes in depth-4 125 are shown. Rather than analyzing each level and following nodes down level-by-level to create DNA sequences as previously discussed, every node at depth-4 125 may be analyzed to determine the scores for every combination of DNA sequences with four variables (i.e., four of C, G, A, or T). Accordingly, the DNA sequence associated with node 205 may be selected because its score of thirty-four is the highest score among the two hundred fifty-six nodes in depth-4 125.

As such, rather than forming sequences level-by-level in the tree, sequences may be created by going down multiple levels at the same time. That is, rather than analyzing four children nodes of a parent node at a level, all the nodes at a deeper level of a subtree may analyzed at once, and therefore, add multiple paths to the sequence. For example, if every fourth level is analyzed, four paths may be added to the sequence.

Figure 2B:
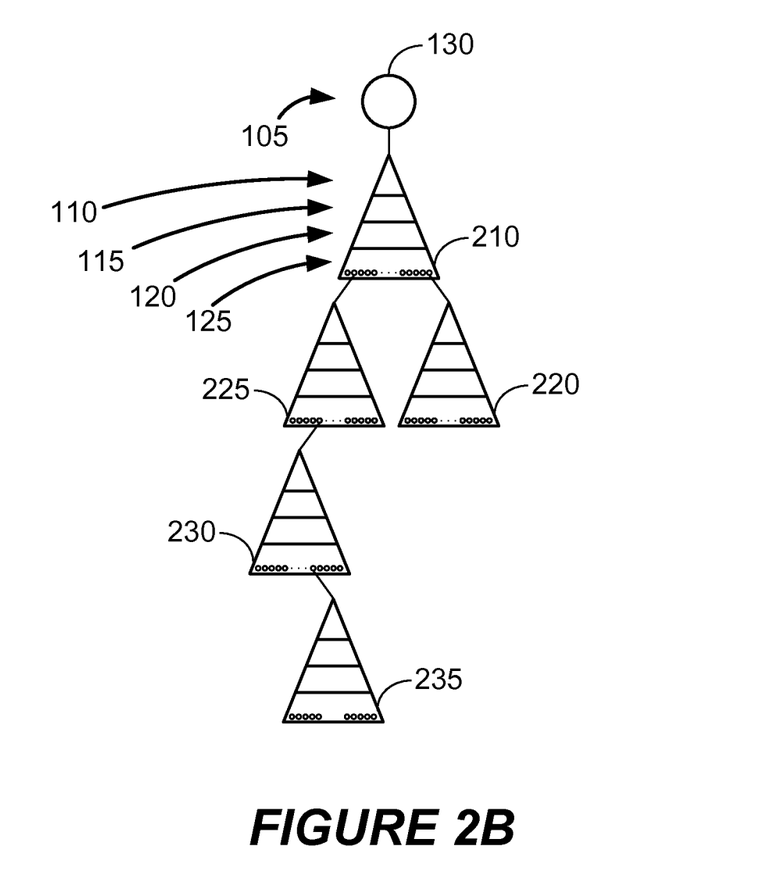
FIG. 2B illustrates an example of descending the tree data structure of FIG. 2A according to an exemplary implementation.

FIG. 2B illustrates an example of descending the tree data structure of FIG. 2A according to an exemplary implementation. In FIG. 2B, nodes multiple levels down are analyzed. For example, in FIG. 2B, four levels of the tree covering subtree 210 are descended down at a time. Based on the scores, the nodes four levels down from the parent node in subtree 210 may be analyzed. That is, the two hundred fifty-six great-great-grandchildren nodes in subtree 220 of the parent node in subtree 210 may be analyzed to form DNA sequences. If the scores associated with the DNA sequences provided by the great-great-grandchildren nodes in the fourth depth level of subtree 220 are lower than another node at the fourth level of subtree 210, the sequence may revert back and a new subtree is explored. For example, subtree 225 may be used to find DNA sequences. Likewise, subtrees 230 and 235 may also be explored based on the scores at the fourth level of nodes in the subtrees in the tree.

Figure 3A:
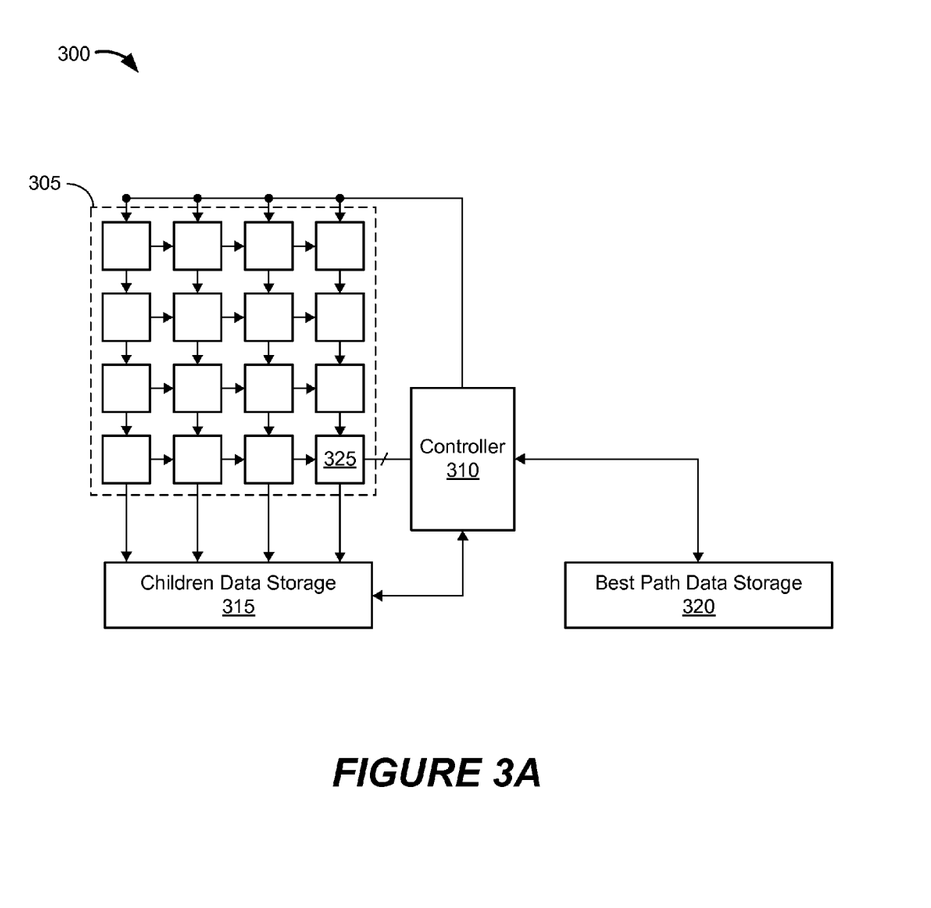
FIG. 3A illustrates a schematic of a systolic array based architecture in accordance with some implementations.

FIG. 3A illustrates a schematic of a systolic array based architecture in accordance with some implementations. Circuit 300 in FIG. 3 may be used for a branch and bound algorithm, such as DNA sequencing, integer programming, "knapsack" problems, and other problems including other combinatorial optimization problems. For example, the schematic in FIG. 3A may perform the aforementioned tree searches.

Circuit 300 includes systolic array 305. Systolic array 305 may include a 1D, 2D, or 3D array of processing units. In the example of FIG. 3A, systolic array 305 includes a 2D pipeline arrangement of processing units, each processing unit performing one or more calculations and providing outputs to neighboring processing units. In FIG. 3A, each processing unit provides outputs to the processing unit to its right and the processing unit to its bottom. In other implementations, other arrangements may be provided. For example, processing units may also provide outputs to the pipeline unit diagonally from it, only provide outputs to processing units to the right, or other arrangements. In some implementations, each processing unit may perform the same or similar calculation in parallel.

Figure 3B:
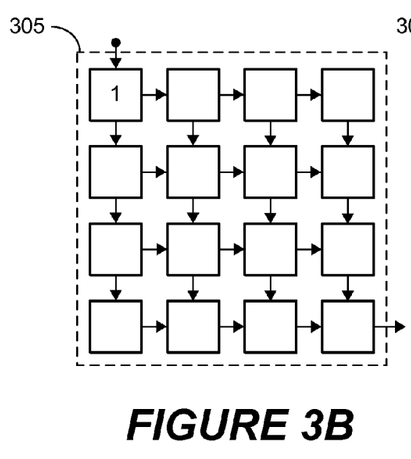
FIGS. 3B, 3C, and 3D illustrate a simplified example of a systolic array performing calculations in parallel.
Figure 3C:
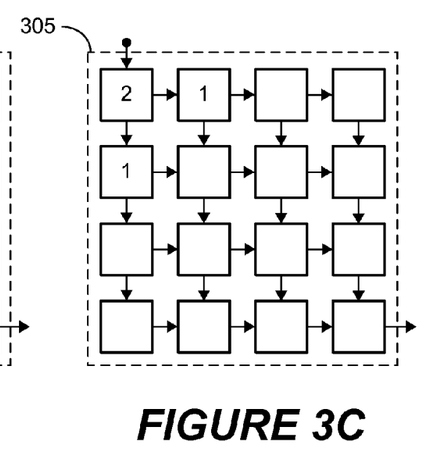
Figure 3D:
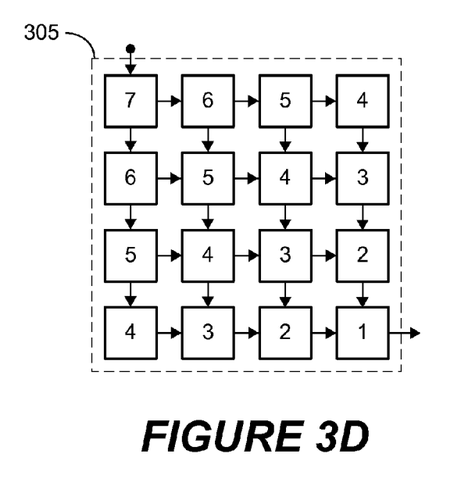

FIGS. 3B, 3C, and 3D illustrate a simplified example of a systolic array performing calculations in parallel. In FIGS. 3B, 3C, and 3D, the numbers in each processing unit of systolic array 305 represent a node of a subtree (e.g., one of the two hundred fifty-six nodes in depth-4 125) for which calculations are being performed. In the simplified example of FIGS. 3B, 3C, and 3D, data comes in at the top-left processing unit of systolic array 305 and progresses through to the bottom-right processing unit. For example, in FIG. 3B, the systolic array is populated with data for the first time, and therefore, data associated with a first node is provided. In the example of DNA sequencing previously described, the first data may be data for a first node (e.g., the left-most node) in depth-4 125 of subtree 210. Next, in FIG. 3C, data for another one of the nodes comes in, and therefore, data for the first node is shifted in the systolic array. Because the input to systolic array 305 is only to the top-left processing unit and the outputs of the processing units in systolic array 305 are providing data to processing units to the right and to the bottom, data calculations for each node may be shifted diagonally across the processing units of systolic array 305. However, other output arrangement may lead to data shifting in different patterns. In FIG. 3D, the processing units of systolic array 305 are all performing calculations in parallel. Additionally, the calculation for the first node is in the bottom-right processing unit, and therefore, provides an output such as a score. The data for each of the two hundred fifty-six nodes in depth-4 125 of subtree 210 may progress through the systolic array to generate scores. In some implementations, a register may be positioned between each processing unit of systolic array 305.

In addition to systolic array 305, circuit 300 in FIG. 3 also includes controller 310, children data storage 315, and best path data storage 320. In an implementation, controller 310 may receive and analyze scores. Controller may store the high scores in best path data storage 320. For example, the eight highest scores among all nodes and depth levels may be stored in best path data storage 320. Accordingly, best path data storage 320 may store node information about nodes from multiple depth levels. Children data storage 315 may receive data from systolic array 305 or controller 310. For example, children data storage 315 may store the history of the path to each of the nodes and calculation data for each of the nodes at the same depth level currently being analyzed by circuit 300. Additionally, data from children data storage 315 may be retrieved and further stored in best path data storage 320. As such, best path data storage 320 may store the best scores, identifier information for the nodes with the best scores, and calculation data results. As such, the circuit in architecture 300 may determine which node to explore and, depending on the scores, revert back to other nodes at previous depth levels elsewhere in a tree or select a node at the current depth level based on the data stored in best path data storage 320.

As an example, controller 310 may receive scores for nodes calculated by systolic array 305. In the scenario of DNA sequencing previously described and the example of circuit 300 in FIG. 3, four scores, under the same parent node, of the two hundred fifty six nodes at depth-4 125 may be provided by processing unit 325 at a time. Controller 310 may analyze the scores. Controller 310 may keep track of a number of high scores and store information associated with the best (e.g., highest) scores in best path data storage 320. Accordingly, if a newly received score provided by systolic array 305 exceeds a score stored in best path data storage 320, the newly received score may be stored in best path data 320 and the old score may be removed. Additionally, other data associated with the newly received score may be stored in best path data storage 320. In particular, children data storage 315 may be provided data from systolic array 305 or controller 310 to store information for each of the two hundred fifty-six nodes. The information may include identifier information for each node. For example, identifier information may be a depth level and node number (e.g., depth-1 and node number four) and/or tree path history information (e.g., the full sequence or path in the tree associated with the node, such as a DNA sequence in a DNA sequencing scenario). Additionally, calculation data associated with the node may also be stored. For example, if each processing unit performs one hundred calculations, the results of the calculations may be stored such that the state of the output of systolic array 305 is saved. In an implementation, if process unit 325 is providing scores for one or more nodes, the calculation data associated with the four bottom nodes may also be stored and associated with the nodes if selected as a node to be stored in best path data storage 320. That is, if the processing units are each performing a number of data calculations, the results of the calculations or state at some of the nodes (e.g., at the output or "end" of systolic array 305) of systolic array 305 may be stored. Accordingly, systolic array 305 may be "reseeded" or "repopulated" with the state data that came out from the bottom of systolic array 305 to resume calculations for that node. Accordingly, systolic array 305 may resume based on the state data that was stored. If the score associated with a node is determined by controller 310 to be stored (e.g., based on having a better score than the node with the lowest score in best path data storage 320) in best path data storage 320, its associated data in children data storage 315 may also be selected and stored in best path data storage 320.

In some implementations, children data storage 315 and best path data storage 320 may be separate memories. In other implementations, both may be in the same memory. Circuit 300 may be implemented in an ASIC or a PLD such as an FPGA, or a combination of the two. Some components may be developed in one type of device and other components developed in another type of device. For example, systolic array 305 may be implemented in a PLD and controller 310 may be implemented in an ASIC. Alternatively, controller 310 may be implemented in an FPGA and systolic array 305 may be implemented in a PLD. In some implementations, systolic array 305 and controller 310 may be implemented in a PLD with children data storage 315 and best path data storage 320 may be implemented in on-chip memory. In other implementations, children data storage 315 and best path data storage 320 may be implemented in off-chip memory. In some implementations, one of children data storage and best path data storage 320 may be implemented on-chip with systolic array 305 and controller 310 and the other may be implemented off-chip.

In some implementations, score calculations from systolic array 305 may be provided to controller 310 and other data (e.g., state data or calculations of the bottom nodes and node identification) may be stored directly in children data storage 315, as depicted in FIG. 3A. However, in other implementations, all data may go through controller 310 and then stored in memory.

Accordingly, circuit 300 determines which node and subtree to continue exploring to solve the algorithm by analyzing the stored node information in best path data storage 320. For example, a node with the highest score may be one of the two hundred fifty-six scores just analyzed, and therefore, its data may be selected from best path data storage 320 to continue calculations from the children nodes at a particular depth level (e.g., four levels down) of the highest score node. As another example, a node at a higher depth level than the two hundred fifty-six scores may be selected, and therefore, circuit 300 may revert the algorithm to the node at a higher depth level.

Accordingly, in an implementation, the selection of a node at the current depth level or reverting to a node at a higher or previous depth level may occur based on the stored scores in best path data storage 320 and the scores provided by systolic array 305. Additionally, as previously discussed, information from best path data storage 320 may be used by controller 310 to select a node or revert the branch and bound algorithm to a node at a previous depth level. As such, the node with the highest score in best path data storage 320 may be selected to explore for solutions to the algorithm. Controller 310 may also obtain the other stored information about the node from best path data storage 320. In particular, controller 310 may obtain the identifier information to determine the position of the node in tree 100. That is, controller 310 may obtain information providing a depth level and node number (e.g., indicating the left-most node in the depth level, second from the left, etc.) and/or the full tree path or sequence to the node (e.g., the DNA sequence associated with the node). Additionally, controller 310 may obtain the calculation or state data associated with the node and systolic array 305 and provide the state data to systolic array 305 in order to "seed" or "populate" systolic array 305 with new data to resume new calculations starting from the selected node.

The implementation of circuit 300 in an ASIC or FPGA may provide faster calculations than a general purpose CPU because systolic array 305 may provide a large amount of calculations in parallel. That is, the computations are mapped more efficiently to the implementation of circuit 300. Accordingly, more paths or sequences may be searched for a more optimal solution. Additionally, by advancing many depth levels at a time, the calculations may be performed faster and reduce the amount of reverting to nodes at higher levels. Moreover, after systolic array 305 has been fully populated, data may be provided at every clock cycle, and therefore, allow for faster performance. Controller 310 may also seed or populate systolic array 305 with new data with a low amount of latency.

Figure 4:
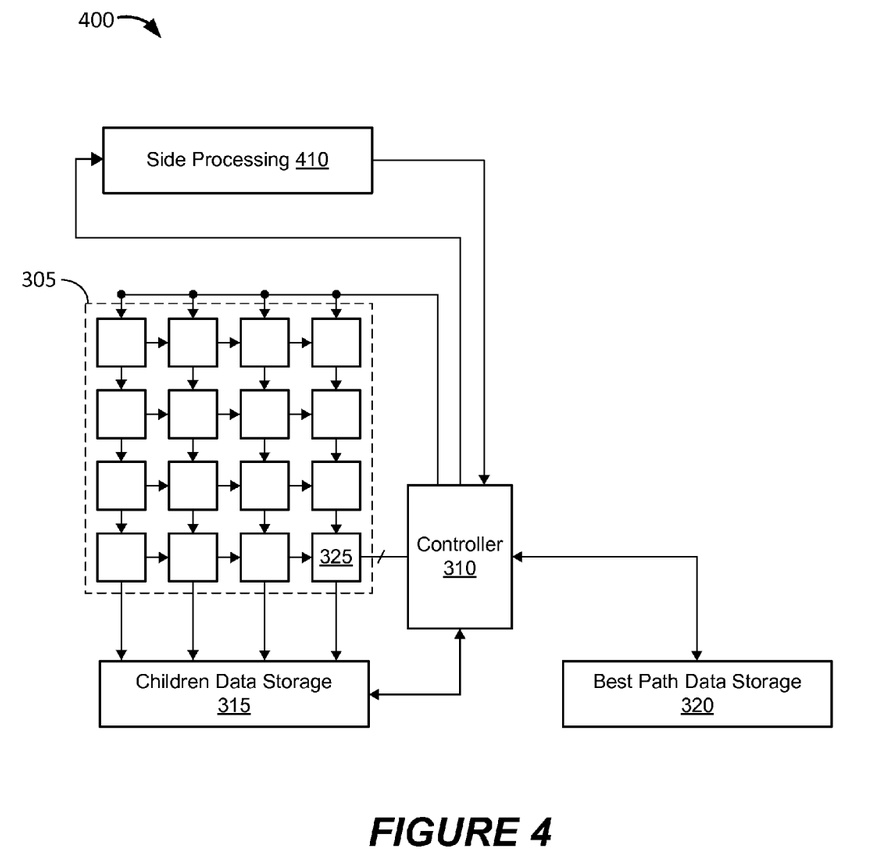
FIG. 4 illustrates a schematic of a systolic array based architecture using a side processing unit in accordance with some implementations.

In some scenarios, an algorithm may do side calculations aside from data associated with the systolic array. FIG. 4 illustrates a schematic of a systolic array based architecture using a side processing unit in accordance with some implementations. In FIG. 4, circuit 400 includes side processing unit 410. Side processing unit 410 may provide additional calculations in parallel with systolic array 305. Accordingly, data from both side processing unit 410 and systolic array 305 may be provided to controller 310 and, in some implementations, may be used by controller 310 to compute a score associated with a node. In other implementations, systolic array 305 may still compute a score and side processing unit 410 may provide other data. As such, when controller 310 obtains data from best path data 320 to select a new node to explore, data may also be provided to side processing unit 410 to seed it with new data for calculations.

Figure 5:
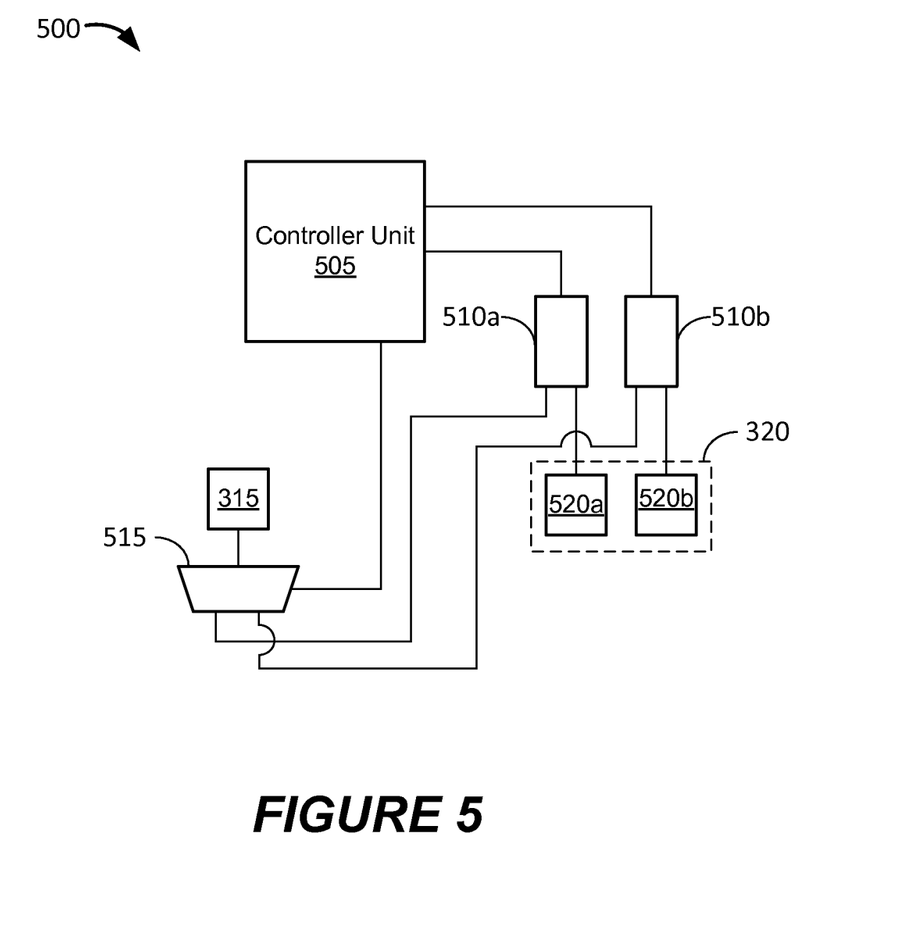
FIG. 5 illustrates a simplified schematic of a controller used in a systolic array based architecture in accordance with some implementations.

FIG. 5 illustrates a simplified schematic of a controller used in a systolic array based architecture in accordance with some implementations. Circuit 500 includes controller unit 505, memory access units 510a and 510b, and demultiplexer 515. The components of the controller interface with children data storage 315 and best path data storage 320. Controller unit 505 may provide data to demultiplexer 515 and memory access units 510a and 510b. For example, controller unit 505 may control memory access units 510a and 510b and store scores or other data associated with the nodes in best path data storage 320. Additionally, controller unit 505 may control demultiplexer 515 and provide data stored in children data storage 315 to memory access units 510a and 510b. Accordingly, controller unit 505 may allow data stored in children data storage 315 to also be stored in best path data storage 320. In some implementations, data for each child node stored in children data storage 315 may be associated with a 1-to-X demultiplexer, where X is associated with the number of stored scores in best path data storage 320. For example, in FIG. 5, a 1-to-2 demultiplexer is used because two scores and associated node data are stored in best path data storage 320 as best scores 520a and 520b. In other implementations, multiplexers may be used, with multiple inputs associated with nodes from child data storage and an output to a memory access unit.

Figure 6:
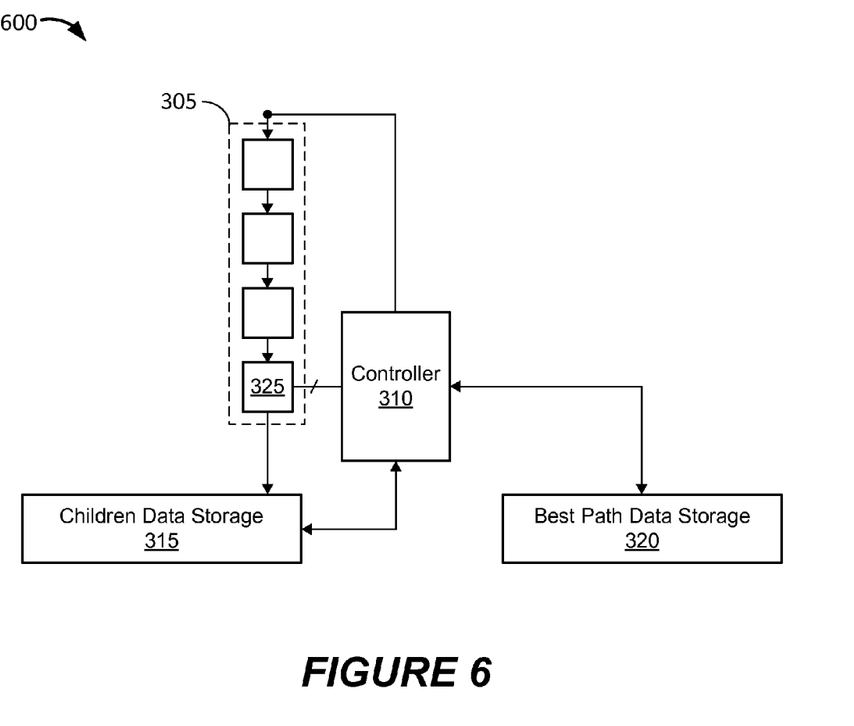
FIG. 6 illustrates another schematic of a systolic array based architecture in accordance with some implementations.

FIG. 6 illustrates another schematic of a systolic array based architecture in accordance with some implementations. In FIG. 6, circuit 600 may be used to solve another type of branch and bound problem, such as a "knapsack" problem. The knapsack problem is another combinatorial optimization problem where, given a set number of items, each with a mass and a value, the number of each item to include within a weight limit may be selected to maximize the total value of selectable items. In FIG. 6, systolic array 305 includes a 1D array of processing units. As in circuit 300 in FIG. 3A, children data storage 315, controller 310, and best path data storage 320 also analyze, store, and/or obtain data, as previously discussed. Accordingly, any arrangement of processing units in systolic array 305 may be used. As such, circuit 300 may be used to solve a variety of combinatorial optimization problems.

In some implementations, characteristics of circuit 300 may be changed. For example, the number of high scores or best paths in best path data storage 320 may be increased or decreased. In an implementation, as the sequence for the path increases, more memory may be used to store the sequence, and therefore, the number of node information stored in best path data storage 320 (i.e., the number of best nodes) may be reduced. Accordingly, enough memory may be available to store longer tree paths or sequences.

In an implementation, the number of depth levels descended at a time may also be increased or decreased. Decreasing the number of depth levels my decrease power requirements due to having fewer calculations.

In one implementation, a designer of a device may use an electronic design automation (EDA) tool to generate a design implementing a systolic array based architecture for branch and bound algorithms. For example, C code may be written and a design may be generated. In other implementations, a graphical user interface (GUI) may be used to implement the arrangement, connections, and calculations of the systolic array. U.S. patent application Publication Ser. No. 14/024,860, titled METHOD AND APPARATUS FOR GENERATING SYSTOLIC ARRAYS ON A TARGET DEVICE USING A HIGH-LEVEL SYNTHESIS LAN- GUAGE, by Yi Ni, filed on Sep. 12, 2013, discloses generating systolic arrays on a device, and is hereby incorporated by reference in its entirety and for all purposes.

In some implementations, if a PLD such as an FPGA is being designed for, configuration data including a configuration bit stream may be generated by an EDA tool. The configuration bit stream may include an indication as to how configuration elements in the FPGA are to be configured such that the systolic array based architecture may be implemented in the device. In particular, the configuration bit stream may include data that corresponds with configuration elements such as configuration random access memory (CRAM) cells which are configured to provide specified functionality within the PLD. Accordingly, the PLD may include configuration circuitry which receives the configuration bit stream, and therefore, configures the PLD to implement the desired functionality by configuring or programming the configuration elements based on the configuration bit stream. As such, the configuration data (e.g., configuration bit stream) may be provided to the configuration circuitry of the PLD such that components may be instantiated or configured into the device.

Figure 7:
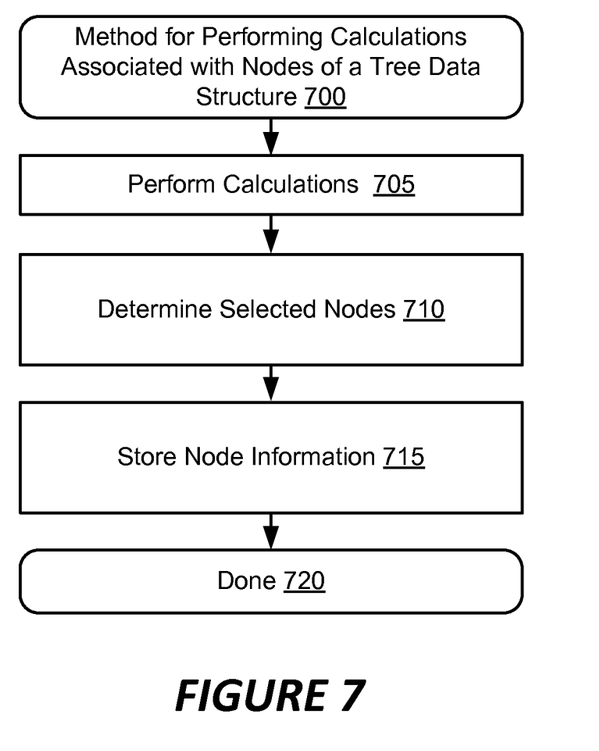
FIG. 7 is a flowchart illustrating a process flow for performing calculations associated with nodes in a tree data structure in accordance with some implementations.

FIG. 7 is a flowchart illustrating a process flow for performing calculations associated with nodes in a tree data structure in accordance with some implementations. In block 705, a systolic array may perform calculations associated with nodes of a tree data structure. In some implementations, scores for the nodes may be generated. In block 710, selected nodes may be determined. For example, the nodes may be selected based on the scores. In block 715, node information associated with the selected nodes may be stored. For example, the node's score, identifier information, and calculation data may be stored. At block 720, the method ends.

The aforementioned techniques and circuits may be implemented in a variety of semiconductor integrated circuits, including ASICs and PLDs such as field programmable gate arrays (FPGAs), structured ASICs, and other devices.

Figure 8:
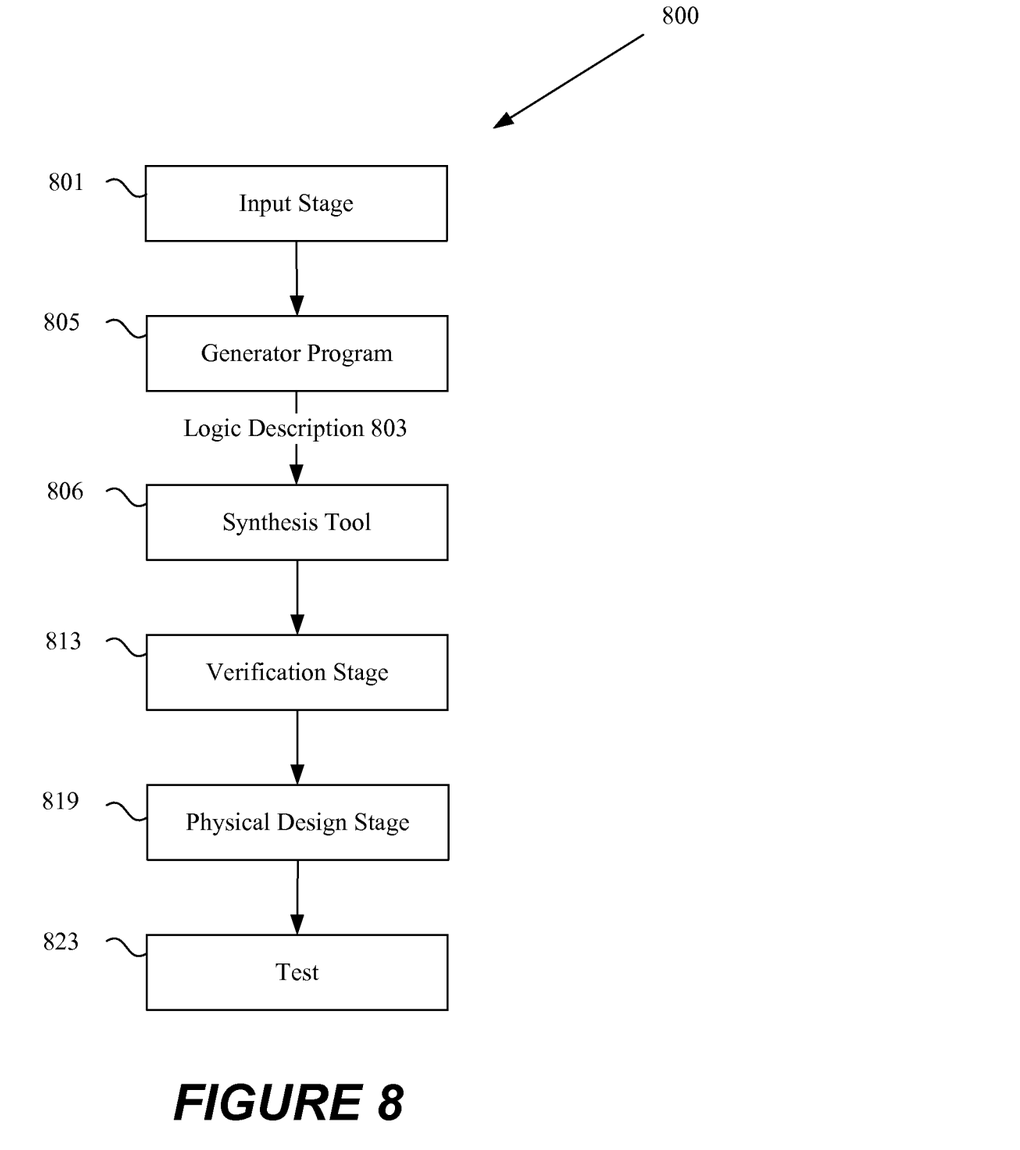
FIG. 8 illustrates a technique for implementing a programmable chip.

As previously discussed, various components may be implemented in a programmable chip. FIG. 8 illustrates a technique for implementing a programmable chip. An input stage 801 receives selection information typically from a user for logic such as a processor core as well as other components to be implemented on an electronic device. In one example, the input received is in the form of a high-level language program. A generator program 805 creates a logic description and provides the logic description along with other customized logic to any of a variety of synthesis tools, place and route programs, and logic configuration tools to allow a logic description to be implemented on an electronic device.

In one example, an input stage 801 often allows selection and parameterization of components to be used on an electronic device. The input stage 801 also allows configuration of hard coded logic. In some examples, components provided to an input stage include intellectual property functions, megafunctions, and intellectual property cores. The input stage 801 may be a graphical user interface using wizards for allowing efficient or convenient entry of information. The input stage may also be a text interface or a program reading a data file such as a spreadsheet, database table, or schematic to acquire selection information. The input stage 801 produces an output containing information about the various modules selected. At this stage, the user may enter security information about individual components that needs to be isolated. For example, different levels of component security and which components are allowed to communicate with each other may be entered.

In typical implementations, the generator program 805 can identify the selections and generate a logic description with information for implementing the various modules. The generator program 805 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 805 identifies pointers and provides ports for each pointer. One tool with generator program capabilities is System on a Programmable Chip (SOPC) Builder available from Altera Corporation of San Jose, Calif. The generator program 805 also provides information to a synthesis tool 807 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 801, generator program 805, and synthesis tool 807 can be separate programs. The interface between the separate programs can be a database file, a log, or simply messages transmitted between the programs. For example, instead of writing a file to storage, the input stage 801 can send messages directly to the generator program 805 to allow the generator program to create a logic description. Similarly, the generator program can provide information directly to the synthesis tool instead of writing HDL files. Similarly, input stage 801, generator program 805, and synthesis tool 807 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 807.

A synthesis tool 807 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 813 typically follows the synthesis stage 807. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 813, the synthesized netlist file can be provided to physical design tools 819 including place and route and configuration tools. A place and route tool locates logic cells on specific logic elements of a target hardware device and connects wires between the inputs and outputs of the various logic elements in accordance with logic and security provided to implement an electronic design. According to various embodiments of the present invention, the place and route tool may perform the techniques of the present invention to implement the various security requirements and rules as defined by the user. The iterative technique may be transparent to the user, but the resulting device can be physically tested at 823.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be used using various techniques of the present invention.

As noted above, different stages and programs can be integrated in a variety of manners. According to one embodiment, the input stage 801, the generator program 805, the synthesis tool 807, the verification tools 813, and physical design tools 819 are integrated into a single program. The various stages are automatically run and transparent to a user. The program can receive the user-selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 9:
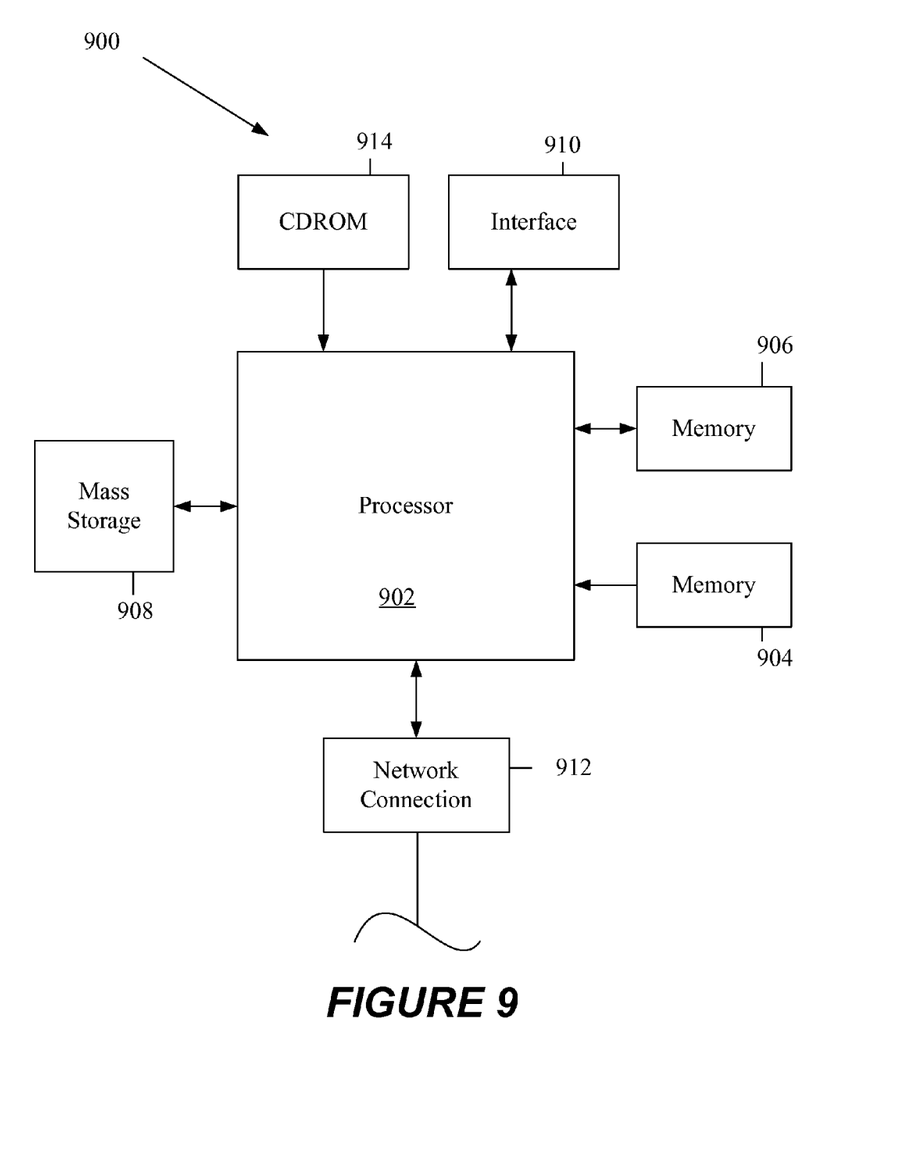
FIG. 9 illustrates one example of a computer system.

FIG. 9 illustrates one example of a computer system. The computer system 900 includes any number of processors 902 (also referred to as central processing units, or CPUs) that are coupled to devices including memory 906 (typically a random access memory, or "RAM"), memory 904 (typically a read only memory, or "ROM"). The processors 902 can be configured to generate an electronic design. As is well known in the art, memory 904 acts to transfer data and instructions uni-directionally to the CPU and memory 906 are used typically to transfer data and instructions in a bi-directional manner.

Both of these memory devices may include any suitable type of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than memory. The mass storage device 908 can be used to hold a library or database of prepackaged logic or intellectual property functions, as well as information on generating particular configurations. It will be appreciated that the information retained within the mass storage device 908, may, in appropriate cases, be incorporated in standard fashion as part of memory 906 as virtual memory. A specific mass storage device such as a CD-ROM 914 may also pass data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU 902 may be a design tool processor. Finally, CPU 902 optionally may be coupled to a computer or telecommunications network using a network connection as shown generally at 912. With such a network connection, it is contemplated that the CPU might receive information from the network, or might output information to the network in the course of performing the above-described process steps. It should be noted that the system 900 might also be associated with devices for transferring completed designs onto a programmable chip. The above-described devices and materials will be familiar to those of skill in the computer hardware and software arts.

Although many of the components and processes are described above in the singular for convenience, it will be appreciated by one of skill in the art that multiple components and repeated processes can also be used to practice the techniques of the present invention.

While particular embodiments of the invention have been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A circuit for performing calculations associated with nodes of a tree data structure, the circuit comprising:
   parallel processing circuitry, comprising a systolic array, the systolic array comprising a plurality of processing units that perform the calculations associated with the nodes of the tree data structure, the calculations including determining scores associated with the nodes, wherein at least a subset of the calculations are performed in parallel by at least a subset of the plurality of processing units;
   a children memory that stores node information associated with the nodes of the tree data structure;
   a best path memory that stores node information associated with selected nodes; and
   a controller that:
   receives the scores;
   determines the selected nodes based on the scores; and
   stores a path solution comprising the node information associated with the selected nodes in the best path memory.

2. The circuit of claim 1, wherein the node information associated with the selected nodes includes the scores associated with the selected nodes.

3. The circuit of claim 2, wherein the node information associated with the selected nodes further includes node identifiers associated with the selected nodes.

4. The circuit of claim 3, wherein the node identifiers provide paths in the tree data structure associated with the selected nodes.

5. The circuit of claim 2, wherein the node information associated with the selected nodes further includes systolic array state data associated with the selected nodes.

6. The circuit of claim 5, wherein the controller provides systolic array state data associated with the selected node having a best score among the selected nodes to the systolic array.

7. The circuit of claim 1, wherein a first node associated with a first score is determined to be a selected node upon determining the first score is better than a second score associated with a second node, the second node among the selected nodes.

8. The circuit of claim 1, wherein the best path memory stores the selected nodes including a first node and a second node, the first node associated with a first level in the tree data structure, the second node associated with a second level in the tree data structure.

9. The circuit of claim 1, wherein the controller further:
tracks a number of high scores for a plurality of paths;
selects a node on each of the plurality of paths based upon the number of high scores; and
stores a plurality of path solutions based upon selected node on each of the plurality of paths.

10. A method for performing calculations associated with nodes of a tree data structure, the method comprising:
performing, by a plurality of processing units of a systolic array of parallel processing circuitry, the calculations associated with the nodes of the tree data structure, the calculations including determining scores associated with the nodes, wherein at least a subset of the calculations are performed in parallel by at least a subset of the plurality of processing units;
storing, in a children memory, node information associated with the nodes of the tree data structure;
receiving, via the controller, the scores;
determining, by a controller, selected nodes based on the scores; and
storing, by the controller, a path solution comprising the node information associated with the selected nodes in the best path memory.

11. The method of claim 10, wherein the node information associated with the selected nodes includes the scores associated with the selected nodes.

12. The method of claim 11, wherein the node information associated with the selected nodes further includes node identifiers associated with the selected nodes.

13. The method of claim 12, wherein the node identifiers provide paths in the tree data structure associated with the selected nodes.

14. The method of claim 11, wherein the node information associated with the selected nodes further includes systolic array state data associated with the selected nodes.

15. The method of claim 14, further comprising:
providing, by the controller, systolic array state data associated with the selected node having a best score among the selected nodes to the systolic array.

16. The method of claim 10, wherein a first node associated with a first score is determined to be a selected node upon determining the first score is better than a second score associated with a second node, the second node among the selected nodes.

17. The method of claim 10, wherein the selected nodes includes a first node and a second node, the first node associated with a first level in the tree data structure, the second node associated with a second level in the tree data structure.

18. The method of claim 10, further comprising:
providing, by the controller, node information associated with one of the selected nodes to the systolic array.

19. A non-transitory machine-readable medium having instructions stored thereon, the instructions for generating configuration data for instantiating components in a parallel processing integrated circuitry device, the instructions executable by a processor to:
generate the configuration data for:
instantiating, in the device, a systolic array, comprising a plurality of processing units that perform calculations associated with nodes of the tree data structure, the calculations including determining scores associated with the nodes, wherein at least a subset of the calculations are performed in parallel by at least a subset of the plurality of processing units;
instantiating a child memory that stores node information associated with the nodes of the tree data structure;
instantiating a best path memory for storing node information associated with selected nodes; and
instantiating, in the device, a controller that executes instructions to:
receive the scores;
determine the selected nodes based on the scores; and
store the node information associated with the selected nodes in a memory.

20. The non-transitory machine-readable medium of claim 19, wherein the node information associated with the selected nodes includes the scores associated with the selected nodes.

21. The non-transitory machine-readable medium of claim 20, wherein the node information associated with the selected nodes further includes node identifiers associated with the selected nodes.

22. The non-transitory machine-readable medium of claim 21, wherein the node identifiers provide paths in the tree data structure associated with the selected nodes.

* * * * *